(12) United States Patent
Tsutsumi et al.

(10) Patent No.: US 10,237,348 B2
(45) Date of Patent: Mar. 19, 2019

(54) NETWORK SYSTEM AND CONTROL METHOD OF A NETWORK SYSTEM, AND A CONTROL DEVICE

(71) Applicant: Seiko Epson Corporation, Tokyo (JP)

(72) Inventors: Koichiro Tsutsumi, London (GB); Junichi Yoshizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 15/135,961

(22) Filed: Apr. 22, 2016

(65) Prior Publication Data
US 2016/0323383 A1 Nov. 3, 2016

(30) Foreign Application Priority Data
Apr. 30, 2015 (JP) .................................. 2015-092861

(51) Int. Cl.
*H04L 29/08* (2006.01)
*G06Q 20/20* (2012.01)

(52) U.S. Cl.
CPC ....... *H04L 67/1097* (2013.01); *G06Q 20/202* (2013.01); *G06Q 20/209* (2013.01)

(58) Field of Classification Search
CPC . H04L 67/1097; G06Q 20/202; G06Q 20/209
See application file for complete search history.

(56) References Cited

U.S. PATENT DOCUMENTS

| 2002/0065727 A1* | 5/2002 | Enoki | G06Q 20/202 705/21 |
| 2008/0126213 A1* | 5/2008 | Robertson | G06Q 20/20 705/21 |
| 2015/0206116 A1* | 7/2015 | Bess | G06Q 20/202 705/21 |

FOREIGN PATENT DOCUMENTS

| JP | 62-085373 A | 4/1987 |
| JP | 2009-009174 A | 1/2009 |

* cited by examiner

*Primary Examiner* — Gil H. Lee
(74) *Attorney, Agent, or Firm* — Foley & Lardner LLP

(57) ABSTRACT

When able to communicate with a control server 15, a POS terminal 10 updates a transaction information management database 414 with transaction information data based on a transaction process. The POS terminal 10 stores the transaction information data when not able to communicate, and when communication is enabled again, causes the control server 15 to update the transaction information management database 414 based on the stored transaction information data. If queried for specific transaction information data while unable to communicate with the control server 15 and the requested transaction information data is not stored locally, the POS terminal 10 queries other POS terminals 10 through the local area network LN for the specific transaction information data.

10 Claims, 11 Drawing Sheets

NETWORK SYSTEM AND CONTROL METHOD OF A NETWORK SYSTEM, AND A CONTROL DEVICE

BACKGROUND

1. Technical Field

The present invention relates to a network system and a control method of a network system, and a control device.

2. Related Art

Technology for deleting transaction information (sales data) generated during a sales transaction in a POS management system is known from the literature. See, for example, JP-A-2009-9174. More recently, network systems (so-called cloud systems) in which a server (a cloud server) connected to a global network such as the Internet executes a process in response to a request from a client have become common.

A benefit of a configuration in which a server manages transaction information by applying the technology of JP-A-2009-9174 to a cloud system is that the server can manage transaction information from a control device connected to a global network. However, there is also a need to handle queries related to transaction information, such as deleting transaction information, when the control device and server cannot communicate with each other.

The present invention is directed to technology enabling a system including a server and a control device that connects to the server through a global network to handle queries related to transaction information based on a transaction process executed by the control device even when the control device and server cannot communicate with each other.

SUMMARY

A network system according to the invention includes: a server configured to store server-side sales data and connect to a global network; and a plurality of control devices configured to communicate with each other through a local area network, execute a transaction process according to a transaction, communicate with the server through the global network. When communication with the server is enabled, the control device sends transaction information based on the transaction process to the server and causes the server to update the server-side sales data based on the transaction information. When communication with the server is disabled, the control device stores the transaction information based on the transaction process. When communication with the server is disabled, the control device is queried about specific transaction information, and the specific transaction information is not stored on the control device, the control device communicates with and queries another control device through the local area network for the specific transaction information.

In another aspect of the invention, when communication with the server is again enabled, the control device sends the stored transaction information to the server and causes the server to update the server-side sales data based on the transaction information.

Thus comprised, a system having a server and a control device that connects to the server through a global network can appropriately handle queries related to transaction information based on a transaction process executed by the control device even when the control device cannot communicate with the server.

In a network system according to another aspect of the invention, when communication with the server is disabled, the control device stores the transaction information based on the transaction process relationally to transaction identification information identifying a transaction. When queried about specific transaction information when communication with the server is disabled, and the query instructs deleting the transaction information corresponding to the specific transaction identification information, the control device deletes the transaction information corresponding to the specific transaction identification information if the transaction information corresponding to the specific transaction information is stored locally by the control device; if the transaction information corresponding to the specific transaction information is not stored locally, the control device communicates with another control device to determine if that other control device has the transaction information corresponding to the specific transaction identification information; and if there is another control device storing the transaction information corresponding to the specific transaction identification information, causes that control device to delete the transaction information.

Thus comprised, updating the server-side data based on transaction information specified for deletion can be prevented.

In a network system according to another aspect of the invention, when there is not another control device storing the transaction information corresponding to the specific transaction identification information, the control device generates and stores a control command for deleting data based on the transaction information from the server-side sales data, and sends the control command to the server when communication with the server is enabled again.

Thus comprised, data based on transaction information specified for deletion can be deleted from the server-side data.

In a network system according to another aspect of the invention, the control device has a recording function for recording on a recording medium, and produces a receipt based on a transaction process.

Thus comprised, a system having a server and a control device with a function for producing receipts based on a transaction process can handle queries related to transaction information based on a transaction process executed by the control device even when the control device and the server cannot communicate with each other.

In a network system according to another aspect of the invention, the control device connects to a recording device having a recording function for recording on a recording medium, and causes the recording device to produce a receipt based on a transaction process.

Thus comprised, a system having a server and a control device that connects to recording device to produce receipts based on a transaction process can handle queries related to transaction information based on the transaction process executed by the control device even when the control device and the server cannot communicate with each other.

Another aspect of the invention is a control method of a network system including a server configured to store server-side sales data and connect to a global network, and a plurality of control devices configured to communicate with each other through a local area network, execute a transaction process according to a transaction, communicate with the server through the global network. The control method causes the control device to execute steps including: when communication with the server is enabled, sending transaction information based on the transaction process to the server and causing the server to update the server-side sales data based on the transaction information; when communication with the server is disabled, storing the transaction information based on the transaction process; and when communication with the server is disabled, the control device is queried about specific transaction information, and the control device does not store the specific transaction information, communicating with and querying another control device through the local area network for the specific transaction information.

In another aspect of the invention, the control method of a network system also has a step of the control device, when communication with the server is again enabled, sending the stored transaction information to the server and causing the server to update the server-side sales data based on the transaction information.

Thus comprised, a system having a server and a control device that connects to the server through a global network can appropriately handle queries related to transaction information based on a transaction process executed by the control device even when the control device cannot communicate with the server.

Another aspect of the invention is a control device including: a communication unit configured to execute a transaction process according to a transaction, communicate with a server through a global network, and communicate with another control device through a local area network; and a control unit. The control unit is configured to send transaction information based on the transaction process of the communication unit to the server, and cause the server to update server-side sales data stored by the server based on the transaction information when communication with the server is enabled; store the transaction information based on the transaction process when communication with the server is disabled; and when communication with the server is disabled, the control device is queried about specific transaction information, and the control device does not store the specific transaction information, control the communication unit to communicate with and query another control device for the specific transaction information through the local area network.

In a control device according to another aspect of the invention, when communication with the server is again enabled, the control unit sends the stored transaction information to the server by the communication unit and causes the server to update the server-side sales data based on the transaction information.

Thus comprised, a system having a server and a control device that connects to the server through a global network can appropriately handle queries related to transaction information based on a transaction process executed by the control device even when the control device cannot communicate with the server.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
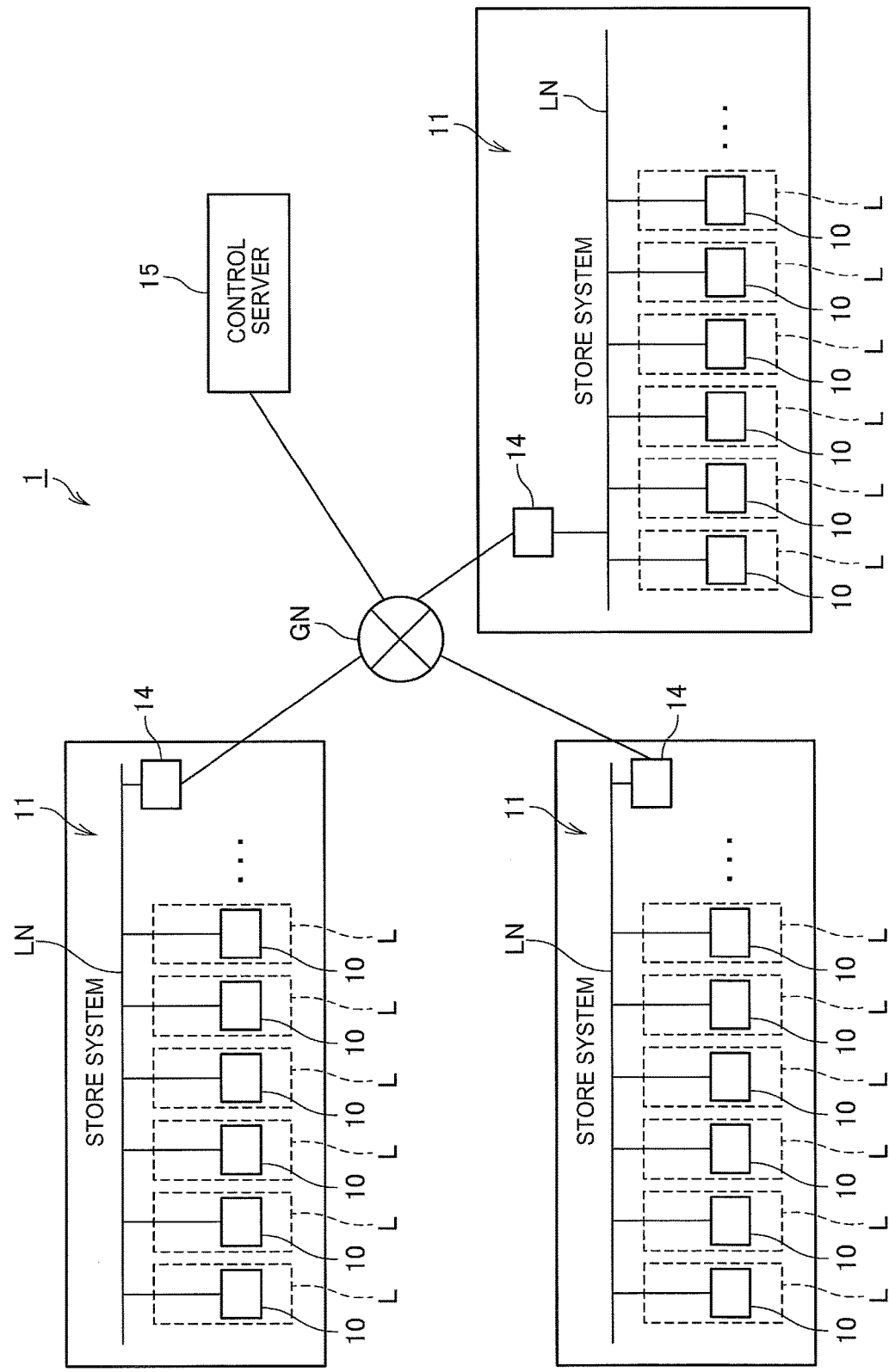
FIG. 1 illustrates the configuration of a network system related to a preferred embodiment of the invention.

FIG. 1 shows the configuration of a transaction processing system 1 (network system) according to a preferred embodiment of the invention.

As shown in FIG. 1, the transaction processing system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

A checkout counter L where customer transactions are processed is located in the business where the store system 11 is deployed. A POS terminal 10 (control device) that can produce receipts appropriate to the transaction is installed at each checkout counter L.

The POS terminal 10 has functions for executing a transaction process appropriate to the transaction performed at the checkout counter L, and producing receipts recorded with information related to the transaction. The receipt produced by the POS terminal 10 is then given to the customer.

The configuration, function, and processes based on the functions of the POS terminal 10 are described further below.

The store system 11 also has a local area network LN.

The POS terminal 10 connects to the local area network LN according to a communication protocol appropriate to the LAN. Any suitable communication protocol may be used by the POS terminal 10 to connect to the local area network LN, and a wired or wireless connection may be used.

A communication device 14 is also connected to the local area network LN. The communication device 14 is an interface device that connects the local area network LN to a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The POS terminal 10 can also access the global network GN through the communication device 14.

A control server 15 (server) connects to the global network GN. The control server 15 is a cloud server in a cloud system in which the POS terminal 10 is a client. More specifically, when triggered by a request from a client device, for example, the control server 15 runs a specific operating process and sends data based on the result of the process to the client. Note that the control server 15 is represented by a single function block in FIG. 1, but this does not mean that the control server 15 is embodied by a single server device. For example, the control server 15 may include a plurality of server devices. More specifically, the control server 15 may be any configuration that can execute the processes described below.

Figure 2:
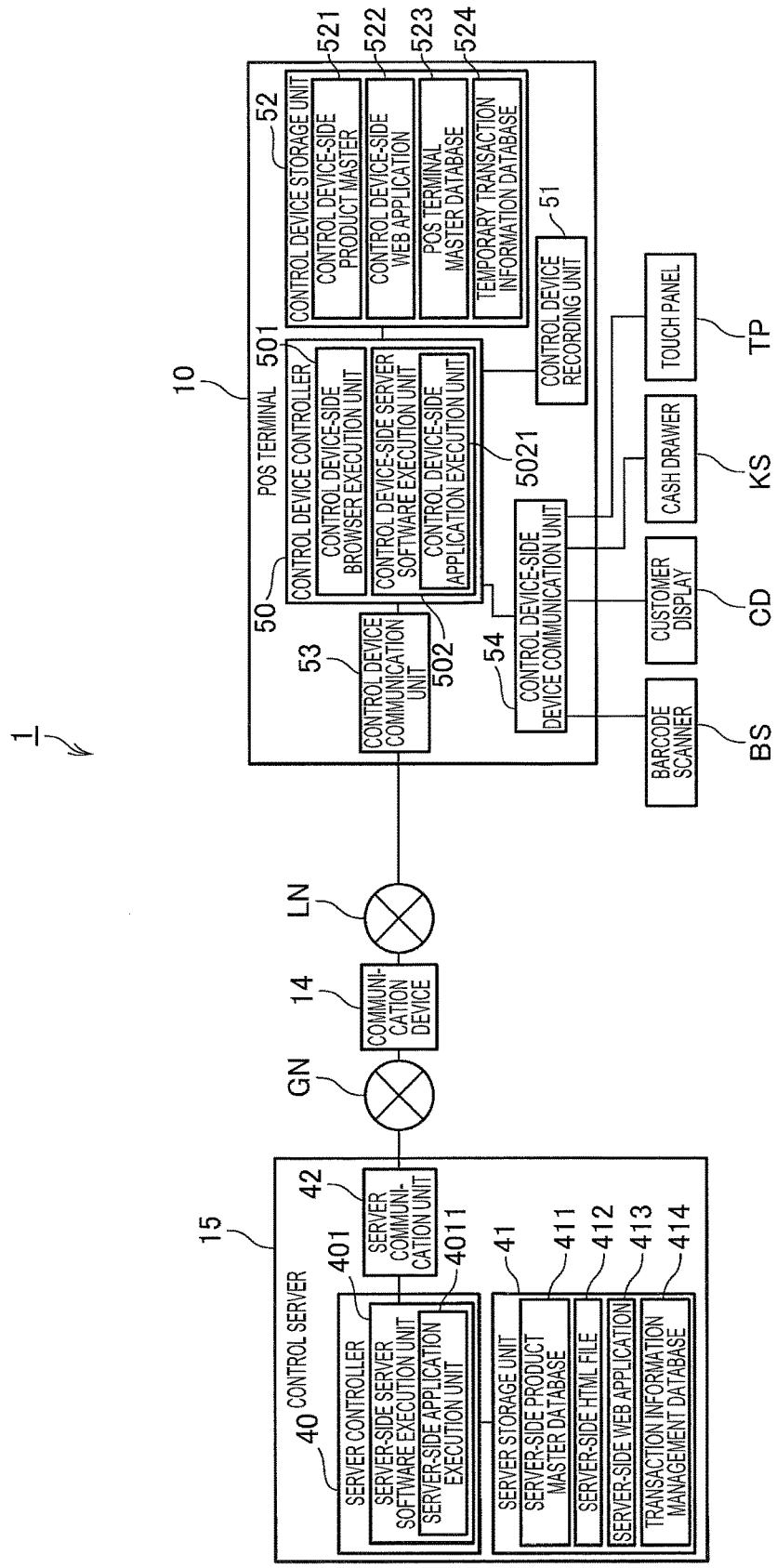
FIG. 2 is a block diagram illustrating the functional configuration of devices in the network system.

FIG. 2 is a block diagram illustrating the functional configuration of the POS terminal 10 and control server 15 in the transaction processing system 1.

The POS terminal 10 stores roll paper (recording medium) and has the functionality of a thermal line printer that records images by forming dots with a thermal line head on the roll paper, executes a transaction process appropriate to the transaction performed at the checkout counter L, and produces a receipt based on the transaction.

As shown in FIG. 2, the POS terminal 10 has a control device controller 50 (control device), a control device recording unit 51, a control device storage unit 52, a control device communication unit 53 (communication unit), and a control device-side device communication unit 54.

The control device controller 50 has a CPU, ROM, RAM, and other peripheral circuits not shown, and controls the POS terminal 10.

The control device recording unit 51 includes mechanisms related to recording on roll paper, such as a conveyance mechanism for conveying roll paper stored inside the cabinet of the POS terminal 10, a recording mechanism for forming dots and recording images on the roll paper with a thermal head, and a cutter mechanism for cutting the roll paper at a specific position. The control device recording unit 51 conveys the roll paper with the conveyance mechanism, records receipt-related images on the roll paper with the recording mechanism, and cuts the roll paper at a specific position with the cutter mechanism as controlled by the control device controller 50 to produce a receipt.

The control device storage unit 52 has nonvolatile memory such as an EEPROM device, and stores data.

The control device storage unit 52 stores a control device-side product master 521, which is a product master database relationally storing the product code of a product to other information related to that product. The information related to the product includes at least the price of the product.

The control device storage unit 52 also stores a control device-side web application 522.

The control device storage unit 52 also stores a POS terminal master database 523. The POS terminal master database 523 is described further below.

The control device storage unit 52 also stores a temporary transaction information database 524. The temporary transaction information database 524 is described further below.

A specific web browser is installed on the POS terminal 10. The control device controller 50 functions as a control device-side browser execution unit 501 by reading and running the installed web browser.

Specific web server software is also installed on the POS terminal 10. The control device controller 50 also functions as a control device-side server software execution unit 502 by reading and running the installed web server software.

The control device-side web application 522 is a software application that is run by the specific web server software application installed on the POS terminal 10, and communicates with the specific web server application by interprocess communication.

The control device-side server software execution unit 502 functions as a control device-side application execution unit 5021 by reading and running the control device-side web application 522.

The control device-side server software execution unit 502 also functions as a server of which the control device-side browser execution unit 501 is a client.

The functions of the function blocks of the control device controller 50, and processes based on those functions, are described further below.

The control device communication unit 53 accesses the local area network LN and communicates with devices (including other POS terminals 10) connected to the network as controlled by the control device controller 50.

The control device communication unit 53 also accesses the global network GN and communicates with devices connected to the network (including the control server 15) through the communication device 14 as controlled by the control device controller 50.

The control device-side device communication unit 54 has an interface board with a USB port, a port conforming to a non-USB serial communication standard, or ports conforming to other communication protocols. Devices can connect to each port. The control device-side device communication unit 54 communicates with devices connected to the POS terminal 10 through the corresponding port as controlled by the control device controller 50.

Note that the control device-side device communication unit 54 may also be configured with a wireless communication capability and communicate with devices wirelessly.

A barcode scanner BS, customer display CD, cash drawer KS, and touch panel TP are devices connected to the POS terminal 10.

The barcode scanner BS is used to read barcodes from products and product packaging, and outputs data representing the barcode to the control device-side device communication unit 54. The control device-side device communication unit 54 then outputs the data input from the barcode scanner BS to the control device controller 50.

The customer display CD displays images as controlled by the control device controller 50. The information presented on the customer display CD can be read by the customer involved in the transaction at the checkout counter L.

The cash drawer KS has a tray for storing cash, and a mechanism for locking the tray, and unlocks and opens the tray as controlled by the control device controller 50.

The touch panel TP has a display device such as an LCD panel or OLED panel, and a touch sensor disposed over the display device for detecting touch operations by the user (including the checkout clerk). The touch panel TP is disposed to a position at the checkout counter L where it can be read by the checkout clerk and operated by touch. The touch panel TP displays images on the display device as controlled by the control device controller 50. The control device-side browser execution unit 501 of the control device controller 50 can display a web page on the touch panel TP based on an HTML file acquired by a specific means. When a touch operation by the user is detected, the touch panel TP outputs a signal indicating the touched position to the control device controller 50.

Based on input from the touch panel TP, the control device controller 50 executes a process corresponding to the touch operation of the user.

As shown in FIG. 2, the control server 15 has a server controller 40, server storage unit 41, and server communication unit 42.

The server controller 40 includes a CPU, ROM, RAM, and other peripheral circuits, and controls the control server 15.

The server storage unit 41 has nonvolatile memory such as a hard disk drive or EEPROM device not shown, and stores data.

The server storage unit 41 stores a server-side product master database 411 relationally storing a product code for each product and the product price.

The server storage unit 41 stores a server-side HTML file 412, which is an HTML file. The server-side HTML file 412 is described further below.

The server storage unit 41 stores a server-side web application 413. The server-side web application 413 is described further below.

The server storage unit 41 also stores a transaction information management database 414 (server-side data). The transaction information management database 414 is described further below.

Specific web server software is installed on the control server 15. The server controller 40 functions as a server-side server software execution unit 401 by reading and running the installed web server software.

The server-side web application 413 is a software application that is run by the specific web server software installed on the control server 15, and communicates with the specific web server application by interprocess communication.

The server-side server software execution unit 401 also functions as a server-side application execution unit 4011 by reading and running the server-side web application 413.

The server communication unit 42 accesses the global network GN and communicates with devices connected to the network (including the POS terminal 10) as controlled by the server controller 40.

Processing a Transaction when Communication Between the POS Terminal 10 and Control Server 15 is Possible The operation of devices in the transaction processing system 1 during a transaction at the checkout counter L when the POS terminal 10 and control server 15 can communicate with each other is described next.

Note that communication being not possible in this embodiment includes when no communication with the control server 15 is possible, when there is a communication delay exceeding a specific timeout period, and when communication is unstable for longer than a specific period.

When the POS terminal 10 and control server 15 cannot communicate with each other in this embodiment of the invention, the POS terminals 10 connected to the local area network LN cannot communicate with the control server 15 due, for example, to a communication device 14 error or a global network GN error (due to network congestion, for example), but the POS terminals 10 can typically communicate with each other through the local area network LN.

The checkout clerk working the register at the checkout counter L (or other person) turns the POS terminal 10 installed at the same checkout counter L on at some specific time before the transaction starts. For example, the checkout clerk may turn the power of the POS terminal 10 on before the store where the transaction processing system 1 is installed opens each day.

The POS terminal 10 is configured to automatically start a specific web browser installed on the POS terminal 10 when the power turns on.

When the browser starts, the control device-side browser execution unit 501 of the POS terminal 10 accesses a specific URL on the control server 15, and accesses the control server 15 by HTTP. The URL of the control server 15 and other information required to communicate with the control server 15 is previously registered. When accessed by the POS terminal 10, the server-side server software execution unit 401 of the server controller 40 of the control server 15 sends the server-side HTML file 412 corresponding to the accessed URL to the POS terminal 10. The control device-side browser execution unit 501 of the control device controller 50 of the POS terminal 10 thus acquires the server-side HTML file 412 transmitted by the control server 15.

A program with functions for communicating with the server-side application execution unit 4011 of the server controller 40 of the control server 15 and executing transaction-related processes is embedded in the server-side HTML file 412 in a specific scripting language. The functions of the control device-side browser execution unit 501 of the control device controller 50 of the POS terminal 10 are embodied by programs written in a specific scripting language that runs on the browser, the server-side web application 413 of the control server 15, the control device-side web application 522 of the POS terminal 10, and associated programs.

The control device-side browser execution unit 501 executes the acquired server-side HTML file 412, and displays a user interface for processing transactions 60 (FIG. 3) on the touch panel TP.

Figure 3:
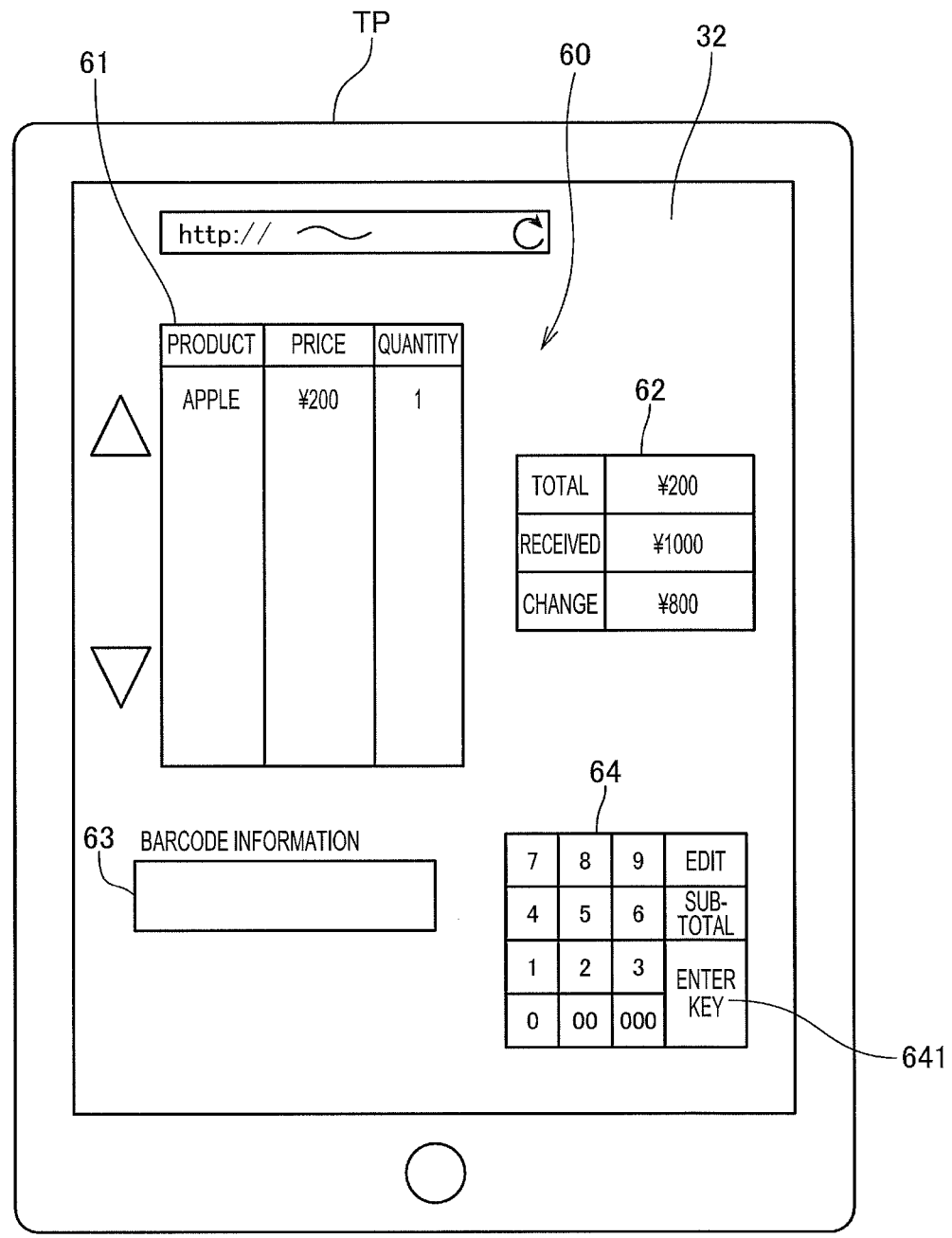
FIG. 3 shows an example of a user interface for a transaction.

FIG. 3 shows an example of a user interface for processing transactions 60 that is displayed on the touch panel TP.

A list display area 61 where the names of the products (product names) being purchased by the customer, the prices of the products, and the quantities of the products are presented in a list is displayed at the top left of the user interface for processing transactions 60 in FIG. 3. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is basically the product code assigned to the product.

A virtual keypad 64 is displayed on the right side of the barcode information display area 63. The virtual keypad 64 includes an Enter key 641 for finalizing the transaction.

Figure 4:
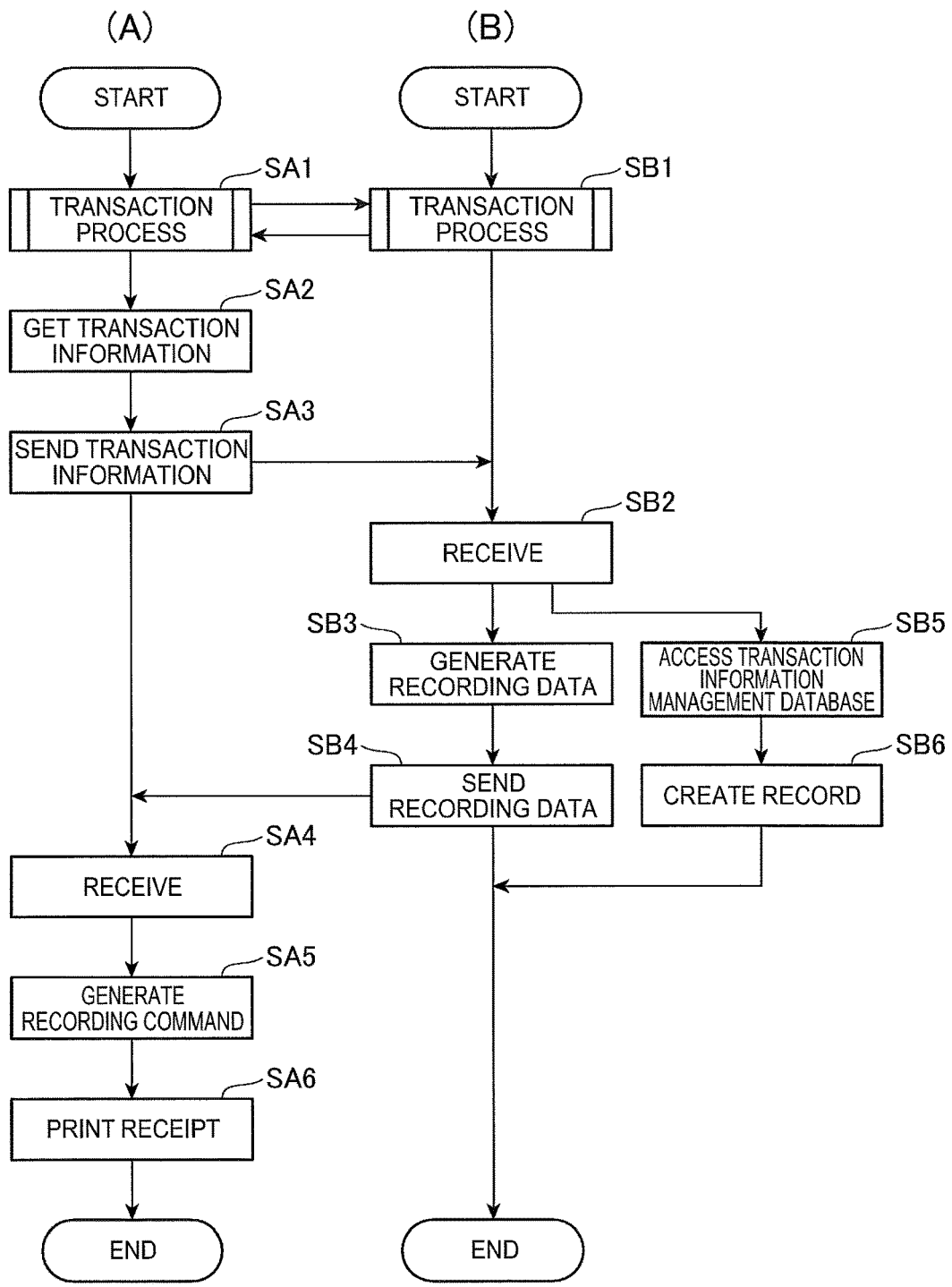
FIG. 4 is a flow chart of the operation of a POS terminal and control server.

FIG. 4 is a flow chart showing the operation of devices in the transaction processing system 1 during a transaction. Column (A) shows the operation of the POS terminal 10, and (B) shows the operation of the control server 15.

As shown in FIG. 4 (A) and FIG. 4 (B), the POS terminal 10 and control server 15 start the transaction process when a transaction begins (step SA1 and step SB1).

Figure 5:
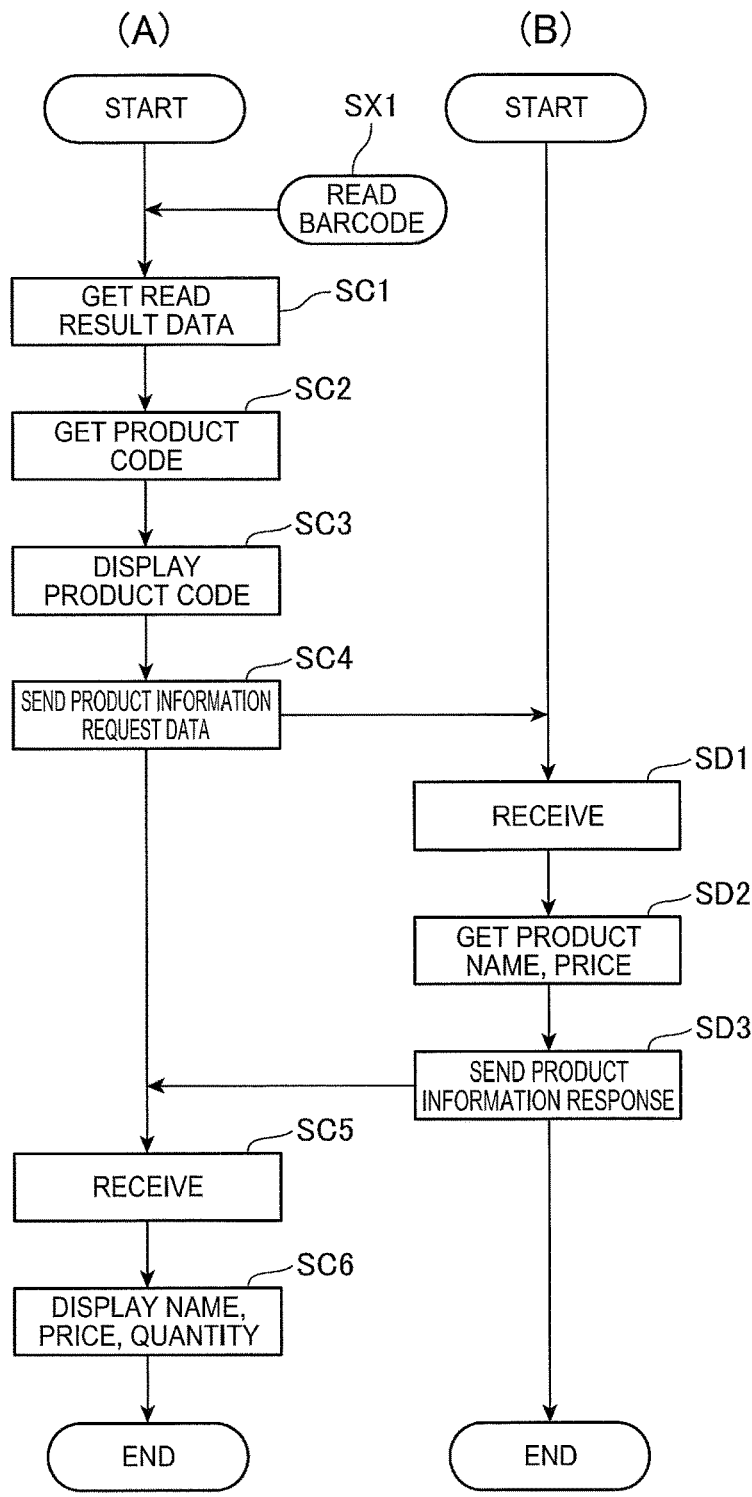
FIG. 5 is a flow chart of the operation of a POS terminal and control server.

FIG. 5 is a flow chart showing part of the process executed by the POS terminal 10 and control server 15 in the transaction process. Column (A) shows the operation of the POS terminal 10, and (B) shows the operation of the control server 15.

In the transaction process, the checkout clerk reads the barcode on the product or the packaging of the product being purchased by the customer with the barcode scanner BS (step SX1). Upon reading a barcode, the barcode scanner BS sends data based on the read result (referred to below as the "read result data") through the port to which the barcode scanner BS is connected to the control device-side device communication unit 54 of the POS terminal 10. The control device-side device communication unit 54 then outputs the read result data to the control device controller 50.

The read result data is data including information indicating the product code of the product.

As shown in FIG. 5 (A), the control device-side browser execution unit 501 of the control device controller 50 of the POS terminal 10 acquires the read result data based on the input from the control device-side device communication unit 54 (step SC1).

Next, the control device-side browser execution unit 501 acquires the product code based on the read result data (step SC2).

Next, the control device-side browser execution unit 501 displays the product code acquired in step SC2 in the barcode information display area 63 of the user interface for processing transactions 60 (step SC3).

Next, the control device-side browser execution unit 501 controls the control device communication unit 53 to send the product name for the product code acquired in step SC2 and data querying the price of the product (referred to below as as product information request data) to the control server 15 (step SC4).

Note that the control device-side browser execution unit 501 manages the information required to communicate with the control server 15, such as the address of the control server 15 and the corresponding protocol, opens a connection with the control server 15 based on the managed information, and communicates data through the opened connection.

As shown in FIG. 5 (B), the server-side application execution unit 4011 of the server controller 40 of the control server 15 controls the server communication unit 42 to receive the product information request data (step SD1).

Next, based on the received product information request data, the server-side application execution unit 4011 acquires the product code, references the server-side product master database 411 stored by the server storage unit 41, and acquires the name and the price of the product identified by the acquired product code (step SD2).

Next, the server-side application execution unit 4011 controls the server communication unit 42, and sends product information response data expressing the product name and price information acquired in step SD2 to the POS terminal 10 (step SD3).

As shown in FIG. 5 (A), the control device-side browser execution unit 501 of the control device controller 50 of the POS terminal 10 controls the control device communication unit 53 to receive the product information response data (step SC5).

Next, the control device-side browser execution unit 501 acquires the product name and product price information based on the received product information response data, and displays the name, price, and quantity of the product in the corresponding fields of the list display area 61 in the user interface for processing transactions 60 (step SC6).

As described above, during a transaction, the checkout clerk reads the barcode with the barcode scanner BS from each product being purchased by the customer, and the POS terminal 10 and control server 15 execute the process shown in the flow chart in FIG. 5 based on the read barcode.

When reading the barcode from every product and processing by each device based on the read barcode is completed, the name, price, and quantity of each product being purchased by the customer is displayed in the list display area 61.

When the barcode of every product has been read, the checkout clerk uses the virtual keypad 64 to confirm the transaction total, receives payment from the customer, and makes change as due. The control device-side browser execution unit 501 of the control device controller 50 of the POS terminal 10 then appropriately displays the total of the products purchased by the customer, the amount received from the customer for the transaction, and the change due to the customer in the amount display area 62 of the user interface for processing transactions 60. The control device-side browser execution unit 501 also controls the customer display CD appropriately to display information related to the transaction on the customer display CD. The control device-side browser execution unit 501 also controls the cash drawer KS appropriately to open the tray of the cash drawer KS.

When change has been given to the customer, the checkout clerk presses the Enter key 641 of the virtual keypad 64 of the user interface for processing transactions 60. The transaction process ends when the checkout clerk operates the Enter key 641.

As shown in FIG. 4 (A), when the transaction process ends, the control device-side browser execution unit 501 of the control device controller 50 of the POS terminal 10 acquires the transaction information (step SA2).

The transaction information is information including: identification information uniquely assigned to each transaction (referred to below as transaction identification information); information denoting the combination of product code, name, price, and quantity for each product purchased by the customer (referred to below as the purchased product information); information denoting the total purchase amount, cash amount received from the customer, and change returned to the customer (referred to below as transaction amount information); information denoting the time of the transaction (referred to below as the transaction time information); and the store ID, which is identification information for the store (business) where the transaction was completed.

Note that during a transaction, the control device-side browser execution unit 501 stores information contained the purchased product information and information contained in the transaction amount information to specific storage areas. In step SB2, the control device-side browser execution unit 501 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

The control device-side browser execution unit 501 also has a function for generating transaction identification information for the transaction, and generates the transaction identification information using this function. The value of the transaction identification information is unique to each transaction performed in each store.

After acquiring the transaction information, the control device-side browser execution unit 501 controls the control device communication unit 53 to send transaction information data indicating the acquired transaction information to the control server 15 (step SA3).

As shown in FIG. 4 (B), the server-side application execution unit 4011 of the server controller 40 of the control server 15 controls the server communication unit 42 to receive the transaction information data (step SB2).

Next, the server-side application execution unit 4011 generates recording data for producing a receipt in a specific layout based on the transaction information indicated by the received transaction information data (step SB3).

The recording data is control data specifying producing a receipt according to a specific layout, and including in this example a top logo, bottom logo, transaction identification information, the time of the transaction, the name, price, quantity and total amount of the products purchased by the customer, the amount received from the customer, and the amount of change due to the customer. The recording data in this embodiment is an XML document of information written in a specific XML format.

Next, the server-side application execution unit 4011 controls the server communication unit 42 to send the generated recording data to the POS terminal 10 (step SB4).

As shown in FIG. 4 (A), the control device-side browser execution unit 501 of the control device controller 50 of the POS terminal 10 controls the control device communication unit 53 to receive the recording data (step SA4).

Next, the control device-side browser execution unit 501, based on the recording data in the XML document, generates recording commands in the command language of the control device recording unit 51 (step SA5).

Next, the control device-side browser execution unit 501, based on the generated recording commands, controls the control device recording unit 51 to produce a receipt (step SA6).

The receipt produced in step SA4 is then given by the checkout clerk to the customer.

As shown in FIG. 4 (B), after the transaction information data is received in step SB2, the server-side application execution unit 4011 of the server controller 40 of the control server 15 accesses the transaction information management database 414 stored by the server storage unit 41 (step SB5).

Each record in the transaction information management database 414 relationally stores the purchased product information, transaction amount information, transaction time information, and store ID.

Next, based on the transaction information data received in step SB2, a record relating the transaction identification information, purchased product information, transaction amount information, transaction time information, and store ID is created in the transaction information management database 414 (step SB6).

The control server 15 thus cumulatively stores transaction information appropriate to the transaction. As a result, the control server 15 can manage sales by store and sales by individual product in each store.

Transaction Processing when the POS Terminal 10 Cannot Communicate with the Control Server 15

Operation of the POS terminal 10 during a transaction at the checkout counter L when the POS terminal 10 cannot communicate with the control server 15 is described next. As described above, communication being not possible in this embodiment includes when no communication with the control server 15 is possible, when there is a communication delay exceeding a specific timeout period, and when communication is unstable for longer than a specific period.

Figure 6:
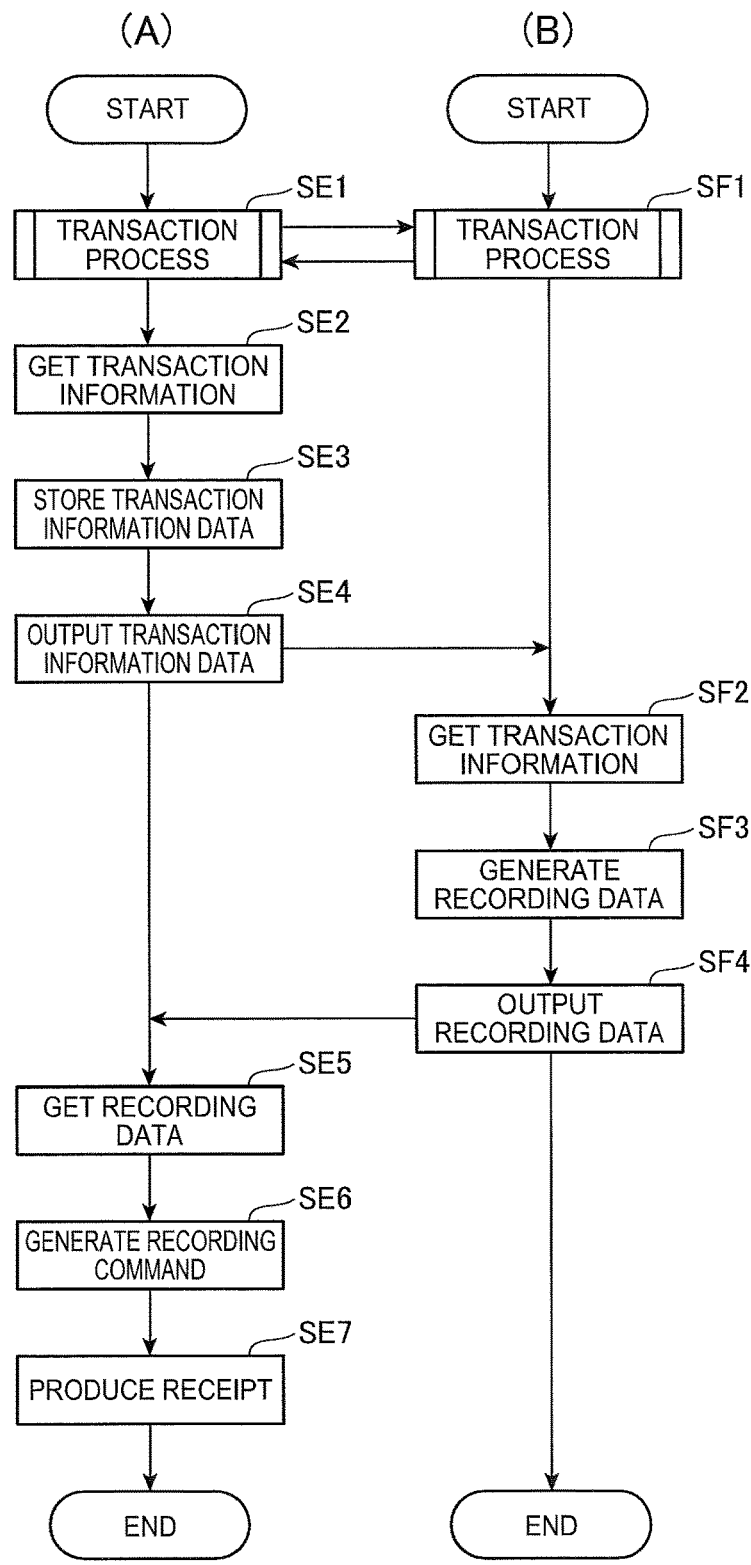
FIG. 6 is a flow chart of the operation of a POS terminal.

FIG. 6 is a flow chart showing the operation of the POS terminal 10 when communication with the control server 15 is not possible, (A) showing the operation of the control device-side browser execution unit 501, and (B) showing the operation of the control device-side server software execution unit 502 (including the control device-side application execution unit 5021).

When the process shown in the flow chart in FIG. 6 starts, acquisition of the server-side HTML file 412 by the control device-side browser execution unit 501 of the POS terminal 10 has completed. More specifically, the process of the flow chart shown in FIG. 6 is based on the POS terminal 10 and control server 15 being not able to communicate with each other for some reason after the control device-side browser execution unit 501 has acquired the server-side HTML file 412.

Note that a configuration that stores a HTML file synchronized by some means with the server-side HTML file 412 in the POS terminal 10, and retrieves the stored HTML file when the control device-side browser execution unit 501 cannot acquire the server-side HTML file 412 from the control server 15 because the control device-side browser execution unit 501 cannot communicate with the control server 15 is also conceivable.

The control device-side browser execution unit 501 executes the process shown in the flowchart in FIG. 6 (A) when it determines before the transaction process starts in step SE1 that communication with the control server 15 is not possible. In this embodiment of the invention, software with a function for intermittently querying the control server 15 for a response and monitoring whether or not communication with the control server 15 is possible based on the result of the request is installed on the POS terminal 10. The control device-side browser execution unit 501 determines by a function of this software if communication with the control server 15 is possible. Note that any appropriate method may be used to determine if communication with the control server 15 is possible.

As shown in FIG. 6 (A) and FIG. 6 (B), the control device-side browser execution unit 501 and the control device-side application execution unit 5021 of the control device-side server software execution unit 502 start the transaction process when the transaction begins (step SE1 and step SF1).

Figure 7:
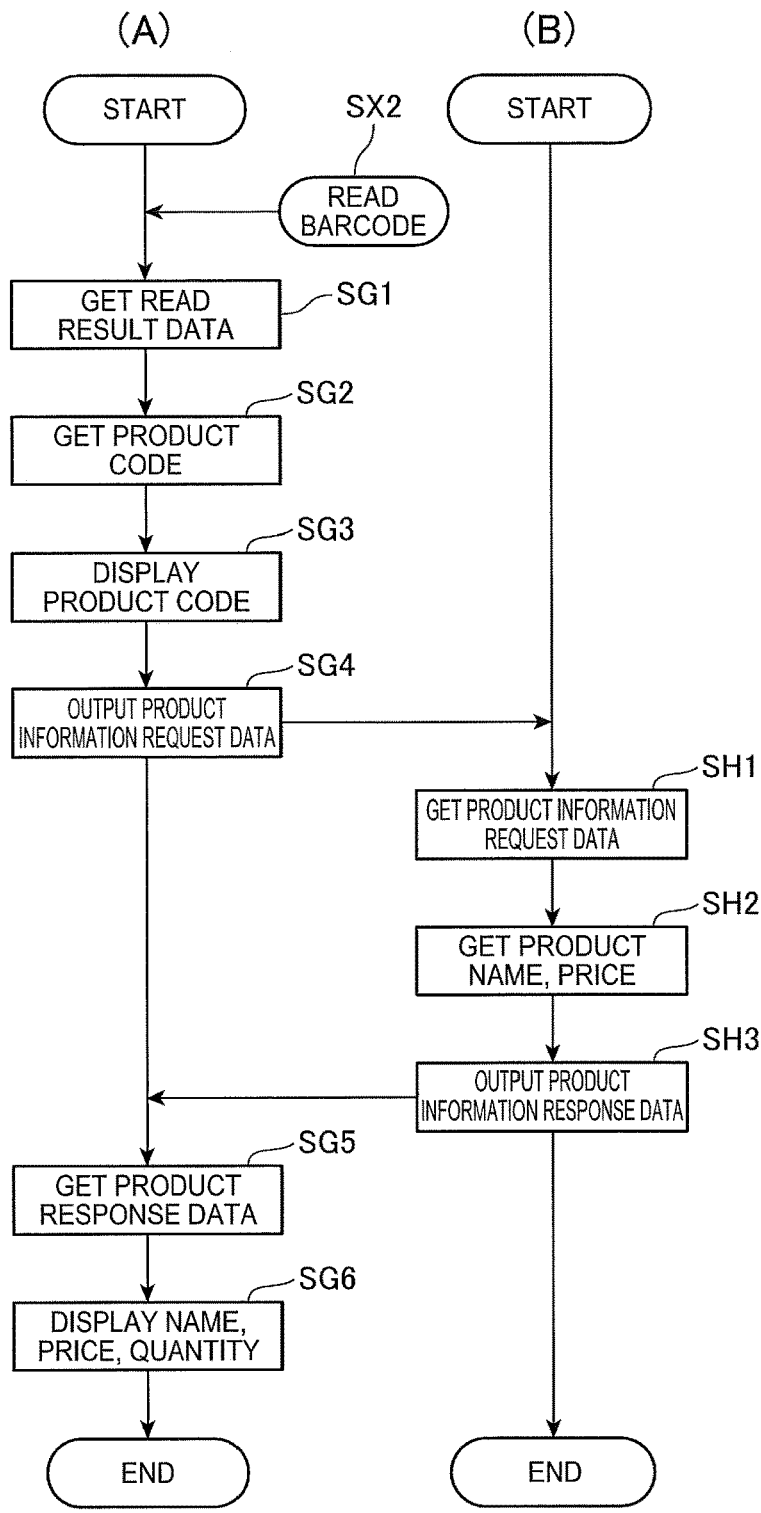
FIG. 7 is a flow chart of the operation of a POS terminal.

FIG. 7 is a flow chart showing part of the process executed by the control device-side browser execution unit 501 and the control device-side application execution unit 5021, (A) showing the operation of the control device-side browser execution unit 501, and (B) showing the operation of the control device-side application execution unit 5021.

When the transaction process starts, the checkout clerk reads the barcode from the product or the packaging of the product being purchased by the customer with the barcode scanner BS (step SX2). When a barcode is read, the barcode scanner BS outputs the read result data through the port to which the barcode scanner BS is connected to the control device-side device communication unit 54 of the POS terminal 10. The control device-side device communication unit 54 then outputs the read result data to the control device controller 50. As described above, the read result data is data containing information indicating the product code of the product.

As shown in FIG. 7 (A), the control device-side browser execution unit 501 of the control device controller 50 of the POS terminal 10 acquires the read result data based on the input from the control device-side device communication unit 54 (step SG1).

Next, the control device-side browser execution unit 501 acquires the product code based on the read result data (step SG2).

Next, the control device-side browser execution unit 501 displays the product code acquired in step SG2 in the barcode information display area 63 of the user interface for processing transactions 60 (step SG3).

Next, the control device-side browser execution unit 501 controls the control device communication unit 53 to output product information request data querying the name and the price of the product identified by the product code acquired in step SG2 to the control device-side application execution unit 5021 (step SG4).

As shown in FIG. 7 (B), the control device-side application execution unit 5021 acquires the product information request data input from the control device-side browser execution unit 501 (step SH1).

Next, the control device-side application execution unit 5021 acquires the product code based on the acquired product information request data, references the control device-side product master 521 stored by the control device storage unit 52, and acquires the name and price of the product identified by the acquired product code (step SH2).

If the POS terminal 10 and control server 15 can communicate, the control device-side product master 521 is synchronized by a specific means with the server-side product master database 411 stored by the control server 15. An example of the means of synchronizing the control device-side product master 521 and the server-side product master database 411 is described below.

More specifically, a dedicated software application with a function for synchronizing the control device-side product master 521 and server-side product master database 411 is installed on the POS terminal 10.

By reading and running this application, the control device controller 50 communicates with the control server 15 at specific times, such as when the POS terminal 10 turns on. The control server 15 then receives and stores a copy of the server-side product master database 411 as the control device-side product master 521 in the control device storage unit 52. The control device controller 50 then intermittently queries the control server 15 for changes to the server-side product master database 411. If the server-side product master database 411 has not been updated between one query and the next, the server-side application execution unit 4011 of the control server 15 reports the same to the POS terminal 10 in response to the query. If the server-side product master database 411 has been updated between one query and the next, the server-side application execution unit 4011 sends to the POS terminal 10 a command to update the control device-side product master 521 appropriately to the change to the server-side product master database 411. If such a control command was received from the control server 15 in response to the query, the control device controller 50 of the POS terminal 10 updates the control device-side product master 521 based on the control command.

Note that the means of synchronizing the control device-side product master 521 and the server-side product master database 411 is not limited to the foregoing. For example, instead of sending such a control command, the control server 15 may send a copy of the server-side product master database 411, or data describing the difference between the previous and current versions of the server-side product master database 411, to the POS terminal 10.

Further alternatively, instead of the POS terminal 10 querying the control server 15 for changes to the master database, the control server 15 may be configured to send the foregoing control command, send a copy of the server-side product master database 411, or data describing the difference between the previous and current versions of the server-side product master database 411, to the POS terminal 10 whenever the server-side product master database 411 is updated.

Next, the control device-side application execution unit 5021 outputs the product information response data denoting the product name and product price information acquired in step SH2 to the control device-side browser execution unit 501 (step SH3).

As shown in FIG. 7 (A), the control device-side browser execution unit 501 acquires the product information response data input from the control device-side application execution unit 5021 (step SG5).

Next, the control device-side browser execution unit 501 acquires the product name and price data based on the received product information response data, and displays the combination of name, price, and quantity information for the product in the appropriate fields of the list display area 61 in the user interface for processing transactions 60 (step SG6).

As shown in FIG. 6 (A), the control device-side browser execution unit 501 acquires the foregoing transaction information when the transaction process ends (step SE2).

Next, the control device-side browser execution unit 501 stores (records) the transaction information data representing the transaction information acquired in step SE2 in the temporary transaction information database 524 of the control device storage unit 52 (step SE3).

The temporary transaction information database 524 is a database that temporarily stores transaction information data cumulatively based on the transaction process executed by the POS terminal 10 when the control server 15 and POS terminal 10 cannot communicate with each other.

As described further below, after the control device-side browser execution unit 501 can communicate again with the control server 15, it sends the transaction information data cumulatively stored in the temporary transaction information database 524 to the control server 15. After sending the transaction information data to the control server 15, the control device-side browser execution unit 501 deletes the transmitted transaction information data from the temporary transaction information database 524.

After storing the transaction information in step SE3, the control device-side browser execution unit 501 outputs the transaction information data to the control device-side application execution unit 5021 (step SE4).

As shown in FIG. 6 (B), the control device-side application execution unit 5021 then acquires the transaction information data input from the control device-side browser execution unit 501 (step SF2).

Next, the control device-side application execution unit 5021 generates recording data for producing a receipt based on the transaction information described by the transaction information data acquired in step SF2 (step SF3). This recording data is an XML document of information written in a specific XML format.

Next, the control device-side application execution unit 5021 outputs the generated recording data to the control device-side browser execution unit 501 (step SF4).

As shown in FIG. 6 (A), the control device-side browser execution unit 501 acquires the recording data input from the control device-side application execution unit 5021 (step SE5).

Next, the control device-side browser execution unit 501 generates recording commands in a command language appropriate to the control device recording unit 51 based on the recording device data in the XML document (step SE6).

Next, the control device-side browser execution unit 501 controls the control device recording unit 51 to produce a receipt based on the generated recording commands (step SE7).

The receipt produced in step SE7 is then given by the checkout clerk to the customer.

As described above, when the POS terminal 10 cannot communicate with the control server 15, the POS terminal 10 processes transactions using the locally stored control device-side product master 521 instead of using the server-side product master database 411 on the control server 15. As a result, the POS terminal 10 can run the transaction process even when the POS terminal 10 and control server 15 cannot communicate, and the user can continue normal store operations.

Operation of the POS terminal 10 and control server 15 after communication is re-enabled from a state in which the POS terminal 10 and control server 15 cannot communicate with each other is described next.

Figure 8:
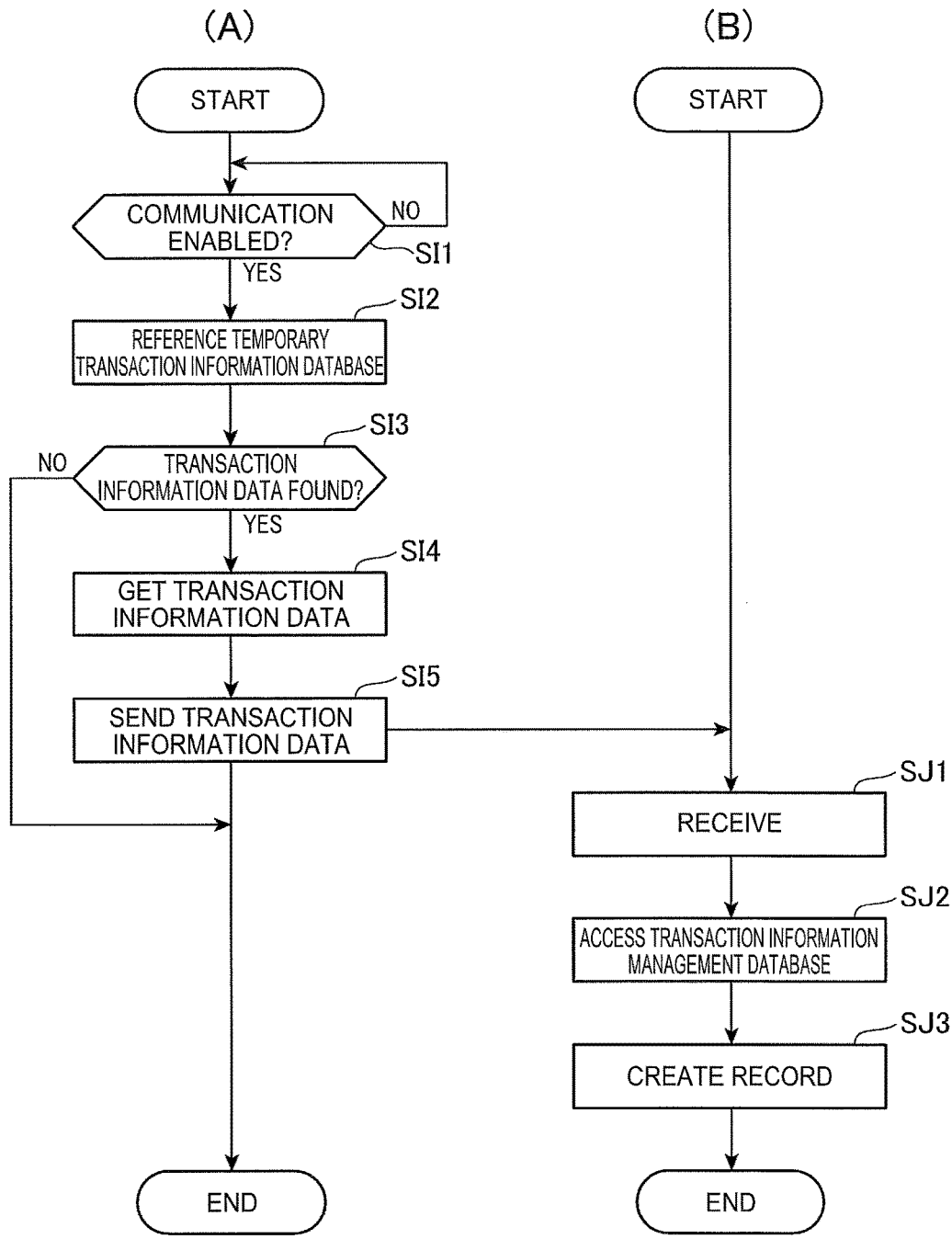
FIG. 8 is a flow chart of the operation of a POS terminal.

FIG. 8 is a flow chart of the operation of the POS terminal 10 and the control server 15 when the POS terminal 10 and control server 15 cannot communicate with each other and communication therebetween is then re-enabled. FIG. 8 (A) shows the operation of the POS terminal 10, and (B) shows the operation of the control server 15. Note that when the flow chart shown in FIG. 8 (A) starts, communication between the POS terminal 10 and the control server 15 is not possible.

As shown in FIG. 8 (A), when communication with control server 15 is so disabled, the control device-side browser execution unit 501 of the POS terminal 10 monitors by a specific means if communication with the control server 15 has been enabled again (step SI1).

If communication with the control server 15 is possible (step SI1: YES), the control device-side browser execution unit 501 references the temporary transaction information database 524 (step SI2).

Next, the control device-side browser execution unit 501 determines if new transaction information data has been stored (registered) in the temporary transaction information database 524 (step SI3).

If at least one record of transaction information data was stored in the temporary transaction information database 524, a transaction was performed at the checkout counter L where the POS terminal 10 is located and the POS terminal 10 ran the transaction process while communication with the control server 15 was disabled.

If at least one record of transaction information data was not stored in the temporary transaction information database 524, a transaction was not performed at the checkout counter L where the POS terminal 10 is located while communication with the control server 15 was disabled.

If at least one record of transaction information data was not stored in the temporary transaction information database 524 (step SI3: NO), the control device-side browser execution unit 501 ends the process.

If at least one record of transaction information data was stored in the temporary transaction information database 524 (step SI3: YES), the control device-side browser execution unit 501 acquires the transaction information data stored in the database (step SI4).

Next, the control device-side browser execution unit 501 controls the control device communication unit 53 and sends all acquired transaction information data to the control server 15 (step SI5).

As shown in FIG. 8 (B), the server-side application execution unit 4011 of the server controller 40 of the control server 15 controls the server communication unit 42 to receive the transaction information data (if there is more than one record of transaction information data, each of the plural transaction information data records) (step SJ1).

Next, the server-side application execution unit 4011 accesses the transaction information management database 414 stored by the server storage unit 41 (step SJ2).

Next, based on each transaction information data record received in step SJ1, the server-side application execution unit 4011 creates a record in the ▯ transaction information management database 414 relationally storing the transaction identification information, purchased product information, transaction amount information, transaction time information, and store ID (if there were plural records of transaction information data, creates a record for each transaction information data record) (step SJ3).

As described above, transaction information data based on transactions that are performed while the POS terminal 10 cannot communicate with the control server 15 is cumulatively stored in the POS terminal 10, and is sent to the control server 15 after communication with the control server 15 is enabled again. Based on the received transaction information data, the control server 15 updates the transaction information management database 414. As a result, even when the POS terminal 10 and control server 15 cannot communicate, a record corresponding to the transaction information data based on the performed transaction is created without fail in the transaction information management database 414 of the control server 15.

A customer may want to cancel a transaction after a transaction is completed at the checkout counter L. An example is when the customer returns a previously purchased product and the checkout clerk returns payment to the customer.

When a transaction is cancelled and a record based on the cancelled transaction was stored in the transaction information management database 414 of the control server 15, the transaction record must also be deleted. If a record based on the cancelled transaction was not stored in the transaction information management database 414, creating a record for the transaction must be prevented. If a record based on a cancelled transaction is in the transaction information management database 414, the cancelled transaction will not be reflected in the content of the transaction information management database 414, and accurately analyzing sales based on the transaction information management database 414, for example, may not be possible.

As described above, a situation in which the control server 15 and POS terminal 10 cannot communicate may occur, and if a transaction is cancelled when this happens and a record based on the cancelled transaction was created in the transaction information management database 414 of the control server 15, that record must be deleted, and if a record based on the cancelled transaction was not created in the transaction information management database 414, creating such a record must be prevented.

The processes executed by the POS terminal 10 and control server 15 when a transaction is cancelled are therefore described below.

If a Transaction is Cancelled while the Control Server 15 and POS Terminal 10 can Communicate The operation of the POS terminal 10 and control server 15 when a transaction is cancelled while the control server 15 and POS terminal 10 can communicate is described first below.

Figure 9:
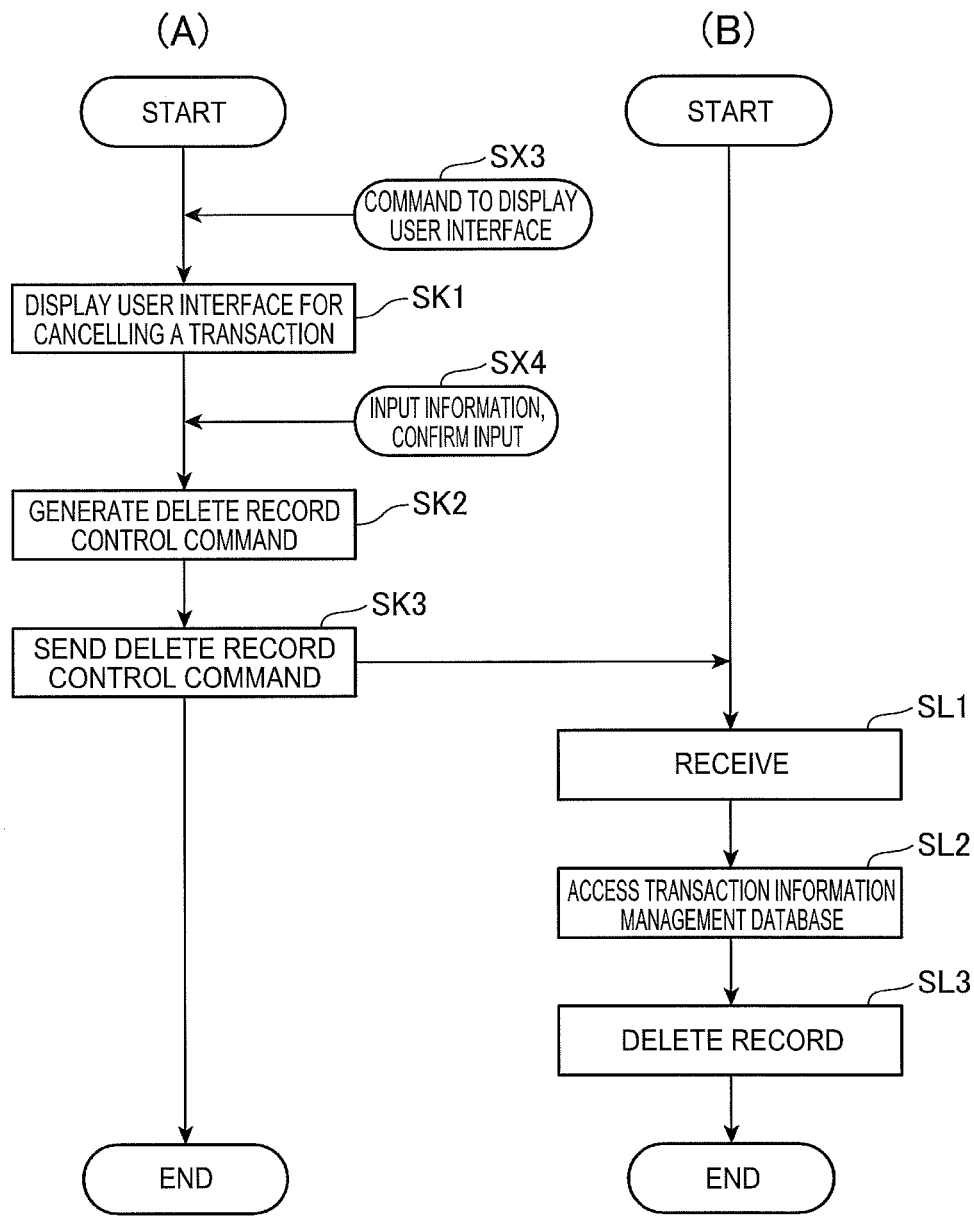
FIG. 9 is a flow chart of the operation of a POS terminal and control server.

FIG. 9 is a flow chart of the operation of the POS terminal 10 and the control server 15 when a transaction is cancelled when the POS terminal 10 and control server 15 can communicate with each other, (A) showing the operation of the POS terminal 10, and (B) showing the operation of the control server 15.

Note that when the flow chart shown in FIG. 9 (A) starts, communication between the POS terminal 10 and the control server 15 is enabled. Because the POS terminal 10 and control server 15 can communicate, a record based on a transaction the customer wants to cancel is stored in the transaction information management database 414 of the control server 15.

A customer wanting to cancel a transaction may request cancelling the transaction at a checkout counter L other than the checkout counter L where the purchase transaction was completed. By the POS terminal 10 executing the process below, the record corresponding to the cancelled transaction can be deleted from the transaction information management database 414 of the control server 15 even if the customer cancels the transaction at a different checkout counter L. As a result, the customer can request cancelling a transaction at any checkout counter L, and customer satisfaction is improved.

To cancel a transaction, the customer presents the sales receipt and the purchased product to the checkout clerk at any one of the checkout counters L. After confirming that the product on the receipt matches the product being returned, the checkout clerk returns payment to the customer.

The checkout clerk also displays a specific user interface for cancelling a transaction 80 (FIG. 10) on the touch panel TP by performing a specific operation (step SX3).

As shown in FIG. 9 (A), the control device-side browser execution unit 501 of the POS terminal 10 displays the user interface for cancelling a transaction 80 on the touch panel TP (step SK1).

Figure 10:
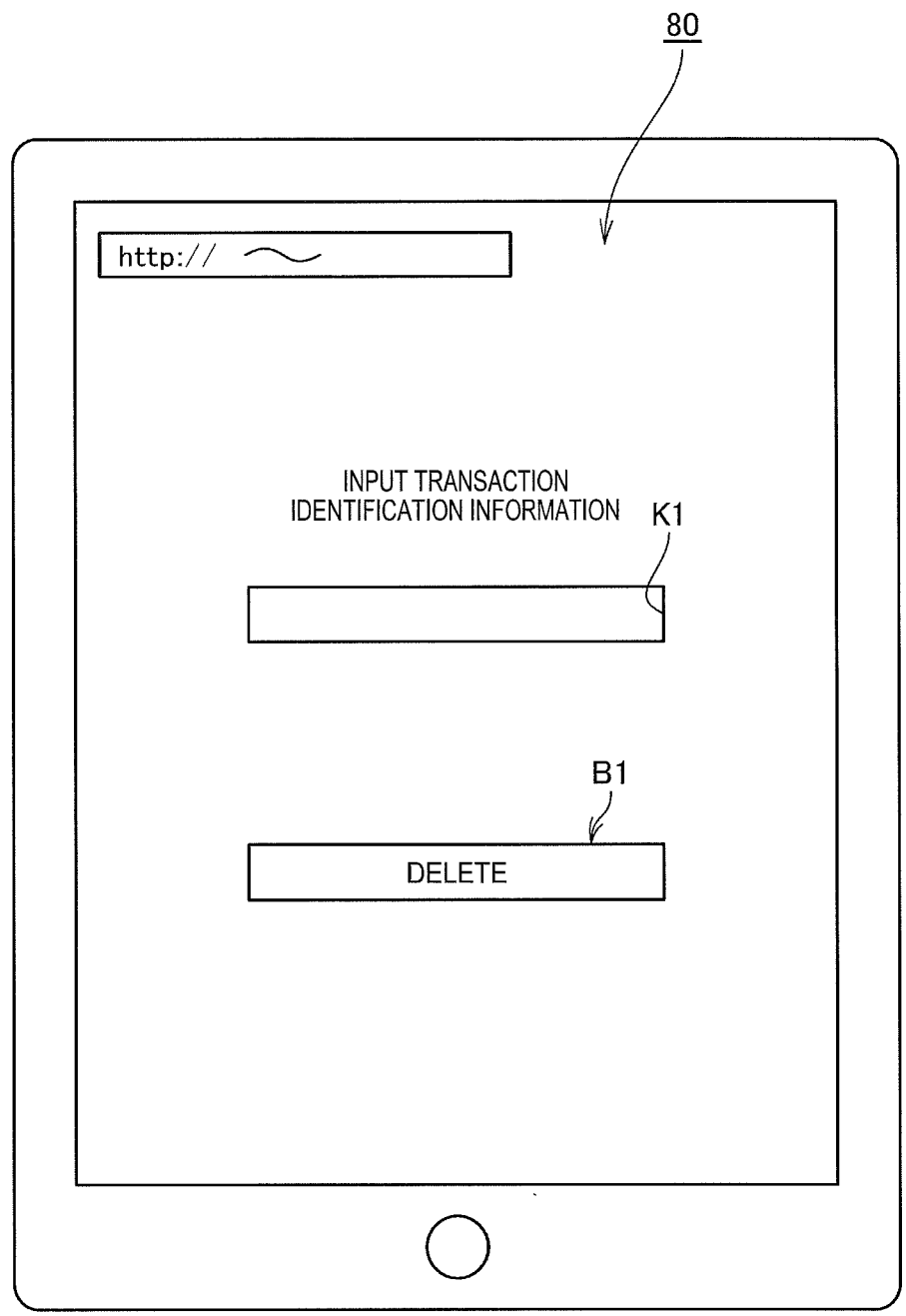
FIG. 10 shows an example of a user interface for cancelling a transaction.

FIG. 10 shows an example of this user interface for cancelling a transaction 80.

As shown in FIG. 10, the user interface for cancelling a transaction 80 has a transaction identification information input field R1. The transaction identification information input field R1 is a field for inputting the transaction identification information of the transaction to cancel. As described above, because transaction information identification information is printed on the receipt, the checkout clerk refers to the receipt received from the customer, and inputs the transaction identification information printed on the receipt to the transaction identification information input field R1.

Note that the transaction identification information may be input to the transaction identification information input field R1 by reading the barcode from the receipt with the barcode scanner BS if a barcode containing the transaction identification information is recorded on the receipt. Further alternatively, if a 2D code denoting the transaction identification information is recorded on the receipt, the transaction identification information may be input to the transaction identification information input field R1 by connecting a reader for reading 2D codes may be connected to the POS terminal 10 and reading the 2D code with the reader.

As shown in FIG. 10, the user interface for cancelling a transaction 80 has a button B1 for cancelling a transaction (deleting the corresponding record from the transaction information management database 414). After inputting the transaction identification information to the transaction identification information input field R1, the checkout clerk touches this button B1 (step SX4).

When operation of the button B1 is detected, the control device-side browser execution unit 501 generates a delete record control command (step SK2).

This delete record control command is a control command that contains the transaction identification information, and instructs deleting the record containing that transaction identification information from the transaction information management database 414. In step SK2, the control device-side browser execution unit 501 acquires the transaction identification information that was input to the transaction identification information input field R1, and generates a delete record control command based on the acquired transaction identification information.

Next, the control device-side browser execution unit 501 controls the control device communication unit 53 to send the delete record control command generated in step SK2 to the control server 15 (step SK3).

As shown in FIG. 9 (B), the server-side application execution unit 4011 of the control server 15 controls the server communication unit 42 to receive the delete record control command (step SL1).

Next, the server-side application execution unit 4011 accesses the transaction information management database 414 (step SL2).

Next, the server-side application execution unit 4011 executes the delete record control command to identify and delete the record in the transaction information management database 414 containing the transaction identification information contained in the control command (step SL3).

As described above, when the POS terminal 10 and control server 15 cannot communicate, the POS terminal 10 sends a delete record control command to the control server 15 when a transaction is cancelled, and based on the delete record control command, the control server 15 deletes the corresponding record. The record based on the cancelled transaction is thus deleted from the transaction information management database 414.

If a Transaction is Cancelled while the Control Server 15 and POS Terminal 10 Cannot Communicate The operation of the POS terminal 10 and control server 15 when a transaction is cancelled while the control server 15 and POS terminal 10 cannot communicate is described first below.

Figure 11:
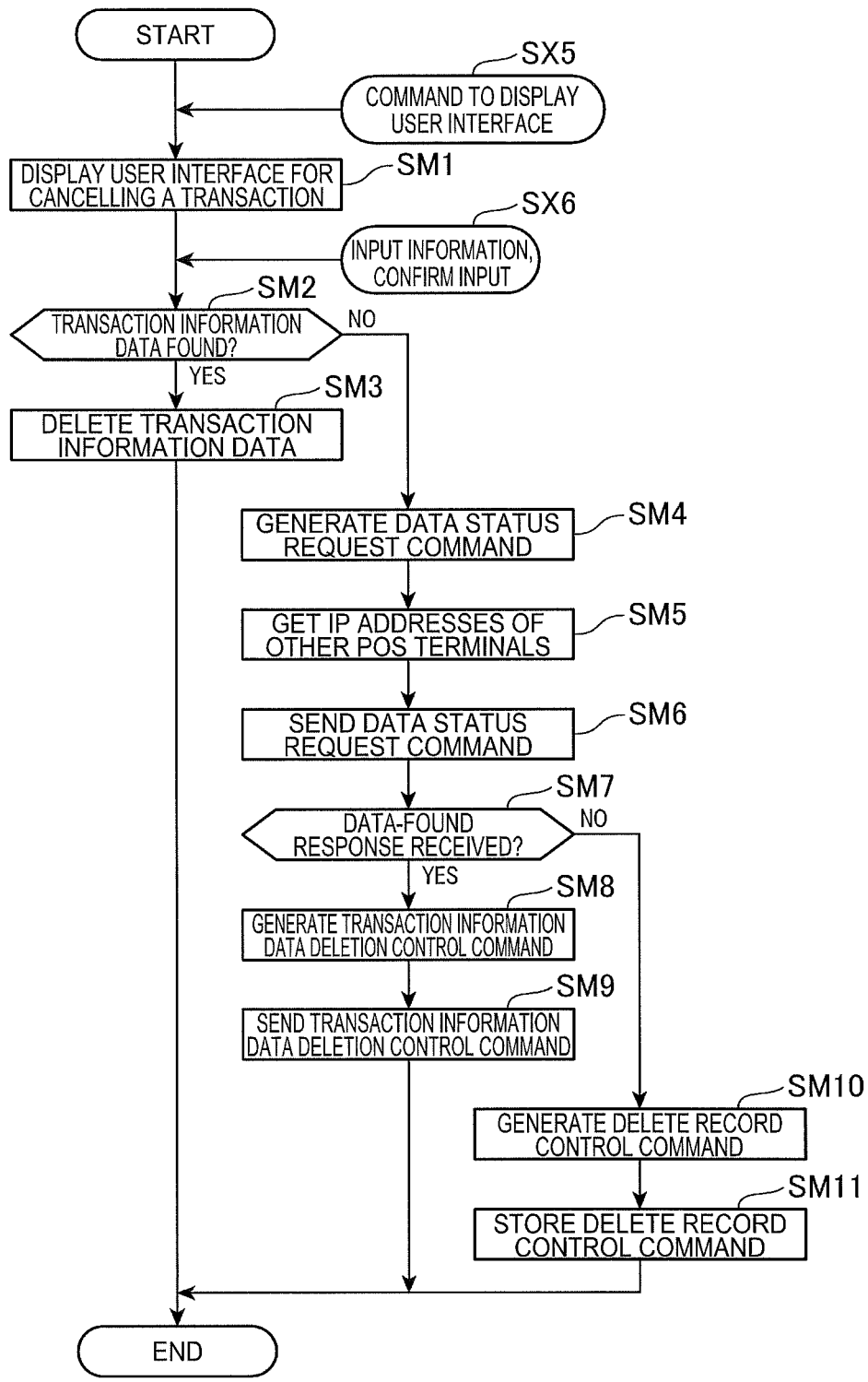
FIG. 11 is a flow chart of the operation of a POS terminal.

FIG. 11 is a flow chart of the operation of the POS terminal 10 when a transaction is cancelled when the POS terminal 10 and control server 15 cannot communicate with each other.

The POS terminal 10 executes the process shown in FIG. 11 when it cannot communicate with the control server 15.

Note that when the flow chart shown in FIG. 11 starts, communication between the POS terminal 10 and the control server 15 is disabled. As a result, a record based on the transaction that the customer wants to cancel may not be stored in the transaction information management database 414 of the control server 15. More specifically, if communication between the POS terminal 10 and control server 15 is continuously disabled from the time the customer performs the transaction until the customer requests cancelling the transaction, a record based on the transaction the customer wants to cancel will have not been created in the transaction information management database 414 of the control server 15.

Note that by the POS terminal 10 executing the process described below, the customer wanting to cancel a transaction can go to any checkout counter L, in the same way as when communication between the POS terminal 10 and control server 15 is enabled, and is not limited to the checkout counter L where the transaction was performed. As a result, the customer can request cancelling a transaction at any checkout counter L, and customer satisfaction is improved.

To cancel a transaction, the customer presents the sales receipt and the purchased product to the checkout clerk at any one of the checkout counters L. After confirming that the product on the receipt matches the product being returned, the checkout clerk returns payment to the customer.

The checkout clerk also displays a specific user interface for cancelling a transaction 80 on the touch panel TP by performing a specific operation (step SX5).

As shown in FIG. 11, the control device-side browser execution unit 501 of the POS terminal 10 displays the user interface for cancelling a transaction 80 on the touch panel TP (step SM1). The checkout clerk inputs the transaction identification information to the transaction identification information input field R1 and operates the button B1 as described above (step SX6).

When operation of the button B1 is detected, the control device-side browser execution unit 501 determines if transaction information data matching the input transaction identification information is in the temporary transaction information database 524 stored by the control device storage unit 52 (step SM2).

If transaction information data matching the input transaction identification information is in the temporary transaction information database 524, a transaction was performed at the checkout counter L where the POS terminal 10 that executed step SM2 is located, the POS terminal 10 executed a transaction process, and a record based on that transaction was then not created in the transaction information management database 414.

If transaction information data matching the input transaction identification information is found in the temporary transaction information database 524 (step SM2: YES), the control device-side browser execution unit 501 deletes the transaction information data from the temporary transaction information database 524 (step SM3). As a result, creating a record based on the cancelled transaction in the transaction information management database 414 is prevented. After step SM3, the control device-side browser execution unit 501 ends the process.

There are two cases, C1 and C2 described below, in which transaction information data matching the input transaction identification information may not be stored in the temporary transaction information database 524.

Case C1: A transaction process was executed by a POS terminal 10, including possibly the POS terminal 10 that executed step SM2, and a record based on the transaction process was already created in the transaction information management database 414.

Case C2: Case C1: A POS terminal 10 other than the POS terminal 10 that executed step SM2 executed the transaction process, and transaction information data based on the transaction process was stored in the temporary transaction information database 524 of this other POS terminal 10.

If transaction information data matching the input transaction identification information is not stored in the temporary transaction information database 524 (step SM2: NO), the control device-side browser execution unit 501 generates a data status request command (step SM4).

A data status request command is a control command that queries the temporary transaction information database 524 and requests a response indicating if there is transaction information data containing transaction identification information matching the transaction information that was input to the transaction identification information input field R1.

The control device-side browser execution unit 501 of the POS terminal 10 that received the data status request command determines if transaction information data containing the transaction identification information contained in the command is stored in the local temporary transaction information database 524 stored in the control device storage unit 52. Next, if the corresponding transaction information data is found in the temporary transaction information database 524, the control device-side browser execution unit 501 responds appropriately (sends a data-found response, and if the data is not found, returns a data-not-found response.

After generating the data status request command in step SM4, the control device-side browser execution unit 501 references the POS terminal master database 523 of the control device storage unit 52, and acquires the IP address of each other POS terminal 10 in the store system 11 (each other POS terminal 10 connected to the local area network LN) (step SM5).

The POS terminal master database 523 is a master database relationally managing, for each other POS terminal 10 in the store system 11 (if there are plural other POS terminals 10, each of the plural other POS terminals 10) information (such as a serial number) identifying the other POS terminal 10 and the IP address of that other POS terminal 10. The POS terminal master database 523 is periodically updated by some specific means to maintain current information about each of the other POS terminals 10 connected to the local area network LN.

Next, the control device-side browser execution unit 501 transmits the data status request command generated in step SM4 to the IP address acquired in step SM5 (if plural IP addresses were acquired, the plural IP addresses) (step SM6).

The control device-side browser execution unit 501 transmits the data status request command in step SM6, and executes the following process after receiving the data-found response or data-not-found response to the data status request command sent to each of the other POS terminals (step SM7). More specifically, in step SM7, the control device-side browser execution unit 501 determines if a data-found response was received.

Note that in responses to the data status request command, either all other POS terminals 10 will send a data-not-found response, or one POS terminal 10 will send a data-found response and all other POS terminals 10 other than that one POS terminal 10 will send a data-not-found response.

If a data-found response is received (step SM7: YES), the control device-side browser execution unit 501 generates a transaction information data deletion control command (step SM8).

A transaction information data deletion control command is a control command containing the transaction identification information input to the transaction identification information input field R1, and instructing deleting the transaction information data identified by that transaction identification information from the temporary transaction information database 524.

Next, the control device-side browser execution unit 501 controls the control device communication unit 53 to send the transaction information data deletion control command generated in step SM8 to the other POS terminal 10 that transmitted the data-found response (step SM9), and ends the process.

The control device-side browser execution unit 501 of the other POS terminal 10 (the POS terminal 10 that transmitted the data-found response) that received the transaction information data deletion control command sent in step SM9 then deletes the corresponding transaction information data from the temporary transaction information database 524 based on the command. As a result, creating a record based on a cancelled transaction in the transaction information management database of the control server 15 is prevented.

If a data-found response is not received (step SM7: NO), the control device-side browser execution unit 501 executes the following process (step SM10). Note that if the data-found response is not received, a record based on a transaction requested to be cancelled is already stored in the transaction information management database 414.

In step SM10, the control device-side browser execution unit 501 generates the delete record control command described above.

Next, the control device-side browser execution unit 501 stores the generated delete record control command in the control device storage unit 52 (step SM11), and ends the process.

After storing the delete record control command in the control device storage unit 52, the control device-side browser execution unit 501 executes the following process. Specifically, the control device-side browser execution unit 501 checks if communication with the control server 15 has been enabled. If communication is possible, the control device-side browser execution unit 501 sends the stored delete record control command to the control server 15. As described above, the control server 15 that received the delete record control command deletes the corresponding record from the transaction information management database 414 based on the received command. As a result, the record based on the cancelled transaction is deleted from the transaction information management database 414.

As described above, a transaction processing system 1 (network system) according to this embodiment of the invention has control server 15 (server) that connects to a global network GN and stores a transaction information management database 414 (server-side data); and a plurality of POS terminals 10 (control devices) that execute transaction processes appropriately to transactions, communicate with the control server 15 over the global network GN, and communicate with each other over a local area network LN.

When communication with the control server 15 is enabled, the POS terminal 10 sends transaction information data (transaction information) based on the transaction process to the control server 15, and causes the control server 15 to update the transaction information management database 414 based on the transaction information data.

When the POS terminal 10 cannot communicate with the control server 15, the POS terminal 10 stores transaction information data based on the transaction process in a temporary transaction information database 524, and when communication with the control server 15 is enabled again, sends the stored transaction information data to the control server 15 and causes the control server 15 to update the transaction information management database 414 based on the transaction information data, and then deletes the transaction information data that was transmitted from the temporary transaction information database 524.

If the POS terminal 10 is queried about specific transaction information data while unable to communicate with the control server 15, and the POS terminal 10 does not locally store the queried transaction information data, the POS terminal 10 communicates with other POS terminals 10 over the local area network LN and queries the other POS terminals 10 for the specific transaction information data.

Thus comprised, when the POS terminal 10 cannot communicate with the control server 15 but the queried transaction information data is stored by another POS terminal 10, the POS terminal 10 can execute a process appropriate to the query based on the transaction information data stored by the other POS terminal 10. In other words, a transaction processing system 1 thus comprised including a control server 15 and POS terminals 10 connected through a global network GN to the control server 15 can handle queries related to transaction information data based on transaction processes executed by the POS terminals 10 even when the POS terminal 10 cannot communicate with the control server 15.

When communication with the control server 15 is not possible in this embodiment of the invention, the POS terminal 10 stores transaction information data containing transaction identification information locally (locally stores transaction information data based on a transaction process related to the transaction identification information). If a command to delete transaction information data corresponding to specific transaction identification information is received as the query related to the transaction information data when communication with the control server 15 is not possible, and the POS terminal 10 locally stores the transaction information data corresponding to the specific transaction information, the POS terminal 10 deletes the transaction information data identified by the specified transaction identification information. If the POS terminal 10 does not itself store the information, it communicates with the other POS terminals 10 to determine if one of the POS terminals 10 stores transaction information data corresponding to the specific transaction identification information, and if there is another POS terminal 10 storing the transaction information data corresponding to the specified transaction identification information, it causes the other POS terminal 10 to delete the transaction information data.

Thus comprised, storing a record based on a cancelled transaction in the transaction information management database 414 of the control server 15 can be prevented.

If there is not another POS terminal 10 storing the transaction information data corresponding to the specific transaction identification information, the POS terminal 10 generates and stores a control command for deleting the record (data) based on the transaction information data from the transaction information management database 414 of the control server 15, and when communication with the control server 15 is restored, sends the generated control command to the control server 15.

Thus comprised, records based on cancelled transactions can be deleted from the transaction information management database 414 of the control server 15.

In this embodiment of the invention the POS terminal 10 has a recording function for recording on roll paper (recording media), and produces receipts based on the transaction processes.

Thus comprised, a transaction processing system 1 having POS terminals 10 capable of producing receipts based on sales transactions, and a control server 15, can appropriately handle queries related to transaction information data based on transaction processes executed by the POS terminals 10 when the POS terminals 10 and control server 15 cannot communicate with each other.

The invention is described above with reference to a preferred embodiment thereof, but the invention is not limited thereto and can be modified and adapted in many ways without departing from the scope of the accompanying claims.

For example, the POS terminal 10 in the foregoing embodiment has a recording function for recording on recording media, and the POS terminal 10 produces receipts based transaction processes. However, a configuration in which a recording device with a recording function is connected to the POS terminal 10, and receipts are produced by the recording device, is also conceivable.

The server-side data in the foregoing embodiment is the transaction information management database 414. However, the server-side data may be any data that reflects a transaction process executed by the POS terminal 10.

When communication with the control server 15 becomes possible in the above embodiment, the stored transaction information data is sent to the control server 15 and the transmitted transaction information data is deleted from the temporary transaction information database 524. However, the temporary transaction information database 524 may store a flag or other information identifying whether or not particular transaction information data has been transmitted to the control server 15. When queried for transaction information data and the transaction information data is found among the untransmitted transaction information data stored in the temporary transaction information database 524, the POS terminal 10 responds that the data was found. By thus storing and not deleting transaction information data when communication with the control server 15 is disabled, transactions performed when communication is not possible can be verified later.

An example of the transaction processing system 1 according to the invention applied to a store system is described above, but the transaction processing system 1 is not limited to being used in stores.

The devices of the transaction processing system 1 may also communicate using any desirable method.

The POS terminal 10 records by a thermal recording method in the foregoing example, but the recording method is not so limited.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system comprising:
   a server configured to store server-side data and connect to a global network; and
   a plurality of control devices configured to communicate with each other through a local area network, execute a transaction process according to a transaction, and communicate with the server through the global network;
   wherein a first control device of the plurality of control devices is configured to:
      send, when communication with the server is enabled, transaction information based on the transaction process to the server and cause the server to update the server-side data based on the transaction information,
      store, when communication with the server is disabled, the transaction information based on the transaction process,
      query, when communication with the server is disabled, responsive to being queried about specific transaction information and responsive to determining that the first control device does not store the specific transaction information, a second control device of the plurality of control devices through the local area network about the specific transaction information,
      respond, when communication with the server is disabled, to an inquiry of the second control device through the local area network, the response indicating a presence or an absence of the specific transaction information, and
      cause, based on a response from the second control device indicating the presence of the specific transaction information, the second control device to update the specific transaction information.

2. The network system described in claim 1, wherein the first control device is configured to:
   send, when communication with the server is again enabled, the stored transaction information to the server and cause the server to update the server-side data based on the transaction information.

3. The network system described in claim 1, wherein the first control device is configured to:
   store, when communication with the server is disabled, the transaction information based on the transaction process relationally to transaction identification information identifying the transaction;
   when queried about specific transaction information when communication with the server is disabled, and the query instructs deleting the transaction information corresponding to the specific transaction identification information:
      delete the transaction information corresponding to the specific transaction identification information if the transaction information corresponding to the specific transaction information is stored locally by the first control device,
      communicate, if the transaction information corresponding to the specific transaction information is not stored locally, with the second control device to determine if the second control device has the transaction information corresponding to the specific transaction identification information, and
      cause, if the second control device stores the transaction information corresponding to the specific transaction identification information, the second control device to delete the transaction information.

4. The network system described in claim 3, wherein the first control device is configured to:
   generate and store, when the second control device does not store the transaction information corresponding to the specific transaction identification information, a control command for deleting data based on the transaction information from the server-side data, and
send the control command to the server when communication with the server is enabled again.

5. The network system described in claim 1, wherein:
the first control device is configured to record on a recording medium, and produce a receipt based on the transaction process.

6. The network system described in claim 1, wherein:
the first control device is configured to connect to a recording device having a recording function for recording on a recording medium, and cause the recording device to produce a receipt based on the transaction process.

7. A control method of a network system including a server configured to store server-side data and connect to a global network, and a plurality of control devices configured to communicate with each other through a local area network, execute a transaction process according to a transaction, and communicate with the server through the global network, the control method comprising causing a first control device of the plurality of control devices to execute processes including:
sending, when communication with the server is enabled, transaction information based on the transaction process to the server and causing the server to update the server-side data based on the transaction information;
storing, when communication with the server is disabled, the transaction information based on the transaction process;
communicating with and querying, when communication with the server is disabled, responsive to being queried about specific transaction information and responsive to determining that the first control device does not store the specific transaction information, a second control device of the plurality of control devices through the local area network about the specific transaction information;
responding, when communication with the server is disabled, to an inquiry of the second control device through the local area network, the response indicating a presence or an absence of the specific transaction information; and
causing, based on a response from the second control device indicating the presence of the specific transaction information, the second control device to update the specific transaction information.

8. The control method of a network system described in claim 7, further comprising causing the first control device to:
send, when communication with the server is again enabled, the stored transaction information to the server and cause the server to update the server-side data based on the transaction information.

9. A control device comprising:
a communication interface configured to communicate with a server through a global network, and communicate with another control device through a local area network; and
a controller configured to:
execute a transaction process according to a transaction, send transaction information based on the transaction process to the server, and cause the server to update server-side data stored by the server based on the transaction information when communication with the server is enabled;
store the transaction information based on the transaction process when communication with the server is disabled;
control, when communication with the server is disabled, responsive to being queried about specific transaction information and responsive to determining that the control device does not store the specific transaction information, the communication interface to communicate with and query another control device about the specific transaction information through the local area network;
respond, when communication with the server is disabled, to an inquiry of the other control device through the local area network, the response indicating a presence or an absence of the specific transaction information; and
cause, based on a response from the second control device indicating the presence of the specific transaction information, the second control device to update the specific transaction information.

10. The control device described in claim 9, wherein the control device is configured to:
send, when communication with the server is again enabled, the stored transaction information to the server by the communication interface and cause the server to update the server-side data based on the transaction information.

* * * * *